F. M. KEANE.
HOOF CUTTING AND HOOF OPENING MACHINE.
APPLICATION FILED FEB. 21, 1913.

1,088,995.

Patented Mar. 3, 1914.

WITNESSES:

INVENTOR
Francis M. Keane
BY Geo. D. Phillips
his ATTORNEY

F. M. KEANE.
HOOF CUTTING AND HOOF OPENING MACHINE.
APPLICATION FILED FEB. 21, 1913.
1,088,995.
Patented Mar. 3, 1914.
2 SHEETS—SHEET 2.
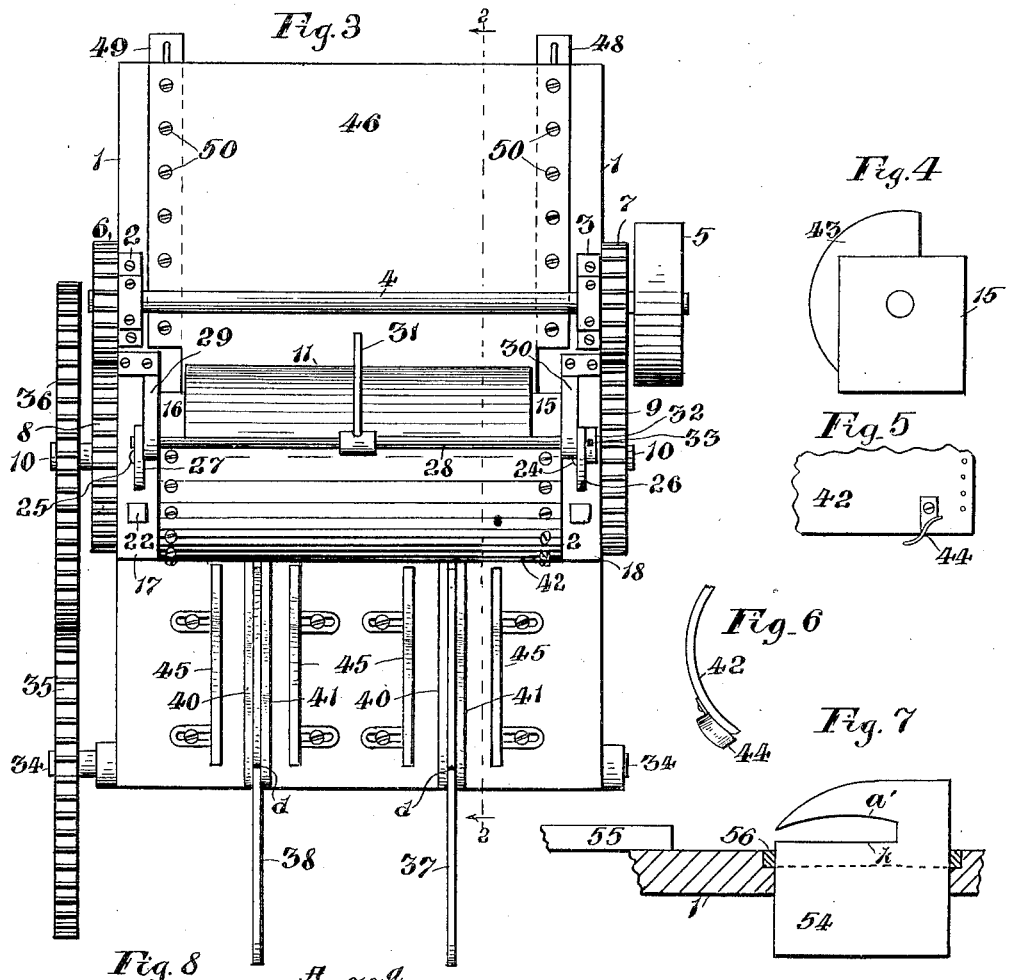
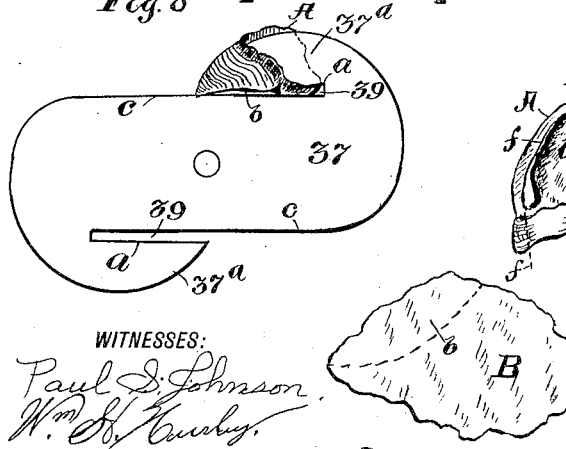
WITNESSES:
Paul D. Johnson
Wm H. Curley
INVENTOR
Francis M. Keane,
BY Geo. D. Phillips.
his ATTORNEY

UNITED STATES PATENT OFFICE.

FRANCIS M. KEANE, OF BOTSFORD STATION, CONNECTICUT.

HOOF-CUTTING AND HOOF-OPENING MACHINE.

1,088,995. Specification of Letters Patent. Patented Mar. 3, 1914.

Application filed February 21, 1913. Serial No. 749,834.

*To all whom it may concern:*

Be it known that I, FRANCIS M. KEANE, citizen of the United States, residing at Botsford Station, in the county of Fairfield and State of Connecticut, have invented certain new and useful Improvements in Hoof-Cutting and Hoof-Opening Machines; and I do hereby declare the following to be a full, clear, and exact description of the invention, such as will enable others skilled in the art to which it appertains to make and use the same.

My invention relates to mechanism for splitting animal hoofs preparatory to their being spread out in sheet form from which button blanks are afterward to be cut.

Figure 1:
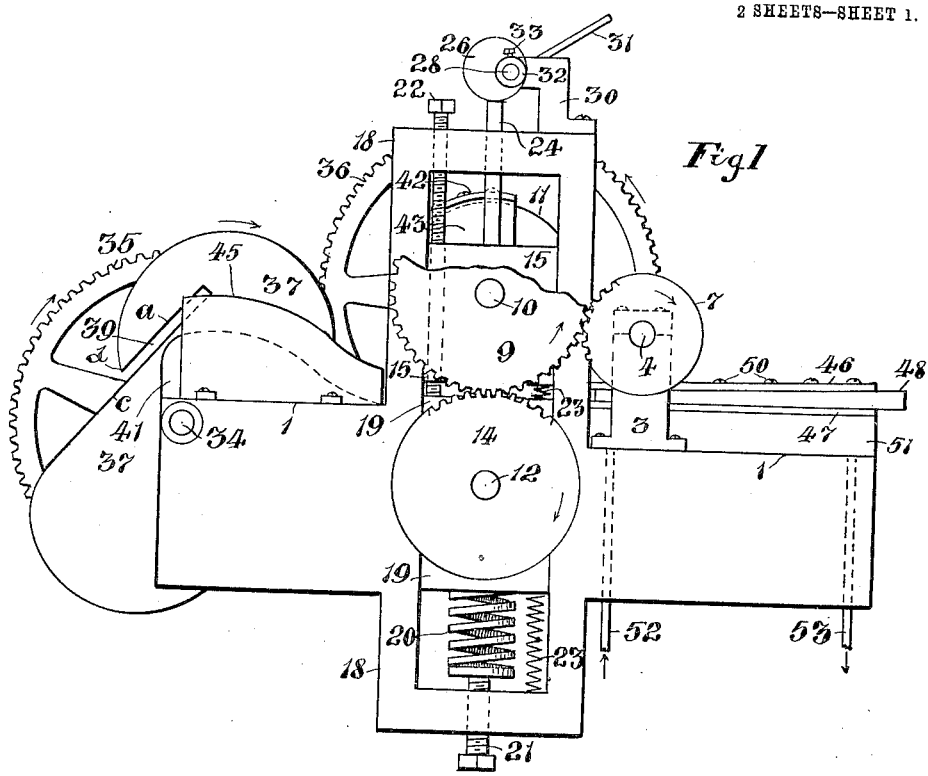
Figure 2:
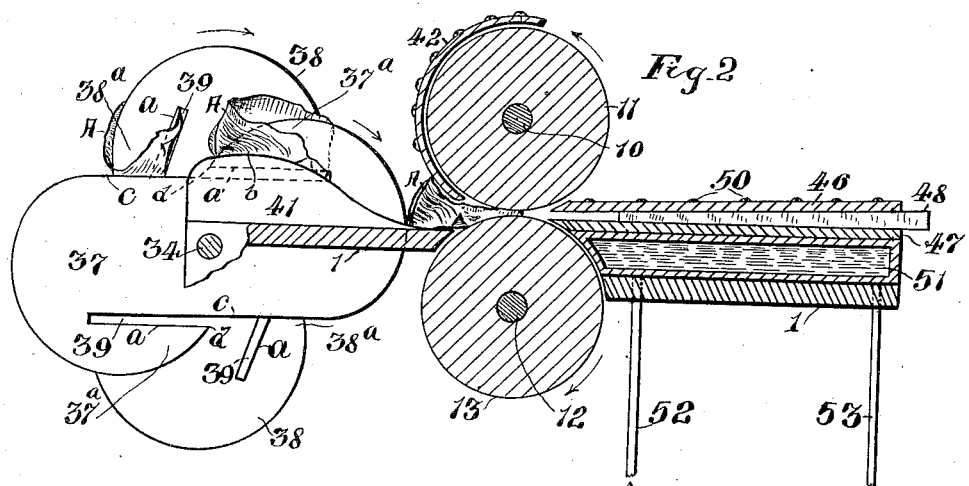

Referring to the drawings in which the same figures and letters of reference indicate like parts throughout the several views: Figure 1 represents a side elevation of the machine, showing a broken view of one of the roll gears, the driving pulley omitted: Fig. 2 is a sectional view on line 2 of Fig. 3 with the machine housings omitted: Fig. 3 is an upper plan view of the machine: Fig. 4 is a detail end view of one of the upper roll boxes: Fig. 5 is a broken detail view of the shield adapted to cover the front of the upper roll, showing means thereon for opening a split hoof: Fig. 6 is a broken detail view and side elevation of the shield shown in Fig. 5: Fig. 7 is a detail modification of the hoof splitting cutter, broken sectional view of the machine bed, and hoof push rod: Fig. 8 is a detail view of one of the hoof splitting cutters with a hoof mounted thereon preparatory to splitting same: Fig. 9 is a view of the bottom of a hoof before splitting: Fig. 10 is a view in perspective of a hoof: Fig. 11 is a view of a hoof in sheet form after passing through the rolls and skiving-knives, and Fig. 12 is a view in perspective of a split hoof.

The bed 1 supports the standards 2, 3, in which is journaled the driving shaft 4 carrying the pulley 5, and the two driving pinions 6 and 7, meshing with the upper gears 8 and 9, mounted on the shaft 10 carrying the upper roll 11. On the shaft 12, of the lower roll 13, Fig. 1, is the gear 14 meshing with the gear of the upper roll. A similar gear on shaft 12 (not shown) meshes with the gear on the opposite end of shaft 10.

The upper roll shaft is journaled in the boxes 15, 16 vertically adjustable in the housings 17 and 18, and the lower roll shaft is also journaled in boxes in the housing, one of which, 19, is shown at Fig. 1.

As the housings and their contents are alike on both sides of the machine, a brief description of one will suffice.

The lower box 19 is supported on the heavy spring 20, adjusted by the screw 21. The position of the box is adjustably fixed by the long bolt 22, passing through the upper box, and contacting with the upper surface of the lower box, while the lighter spring 23 keeps the upper roll boxes against the pins 24 and 25, vertically movable in the upper part of the housings. The upper roll is vertically adjusted by means of these pins and the cams 26 and 27, mounted on the ends of the shaft 28, journaled in the standards 29 and 30. 31 is a handle lever for rotatably actuating said cams. The cam 26 has the hub 32, carrying the set screw 33, so that one cam may be operated irrespective of the other, in order to set the top roll at an angle with the bottom roll for the purpose presently to be described. As the vertical adjustment of the rolls is very slight, the teeth of their gears will be of sufficient length to permit of such adjustment.

The cutter shaft 34 is rotated in the same direction and at the same speed as the rolls through the medium of its gear 35, meshing with the gear 36 on the upper roll shaft. Hoof cutters, 37 and 38, are carried by shaft 34, and operate to split the hoof A as follows: 37$^a$ and 38$^a$ are overhanging cutting lips, having cutting edges *a*. 39 are recesses between these cutting edges and the straight surfaces *c* of the body portion of the cutter on which the sole *b* of the hoof is adapted to rest during the cutting process. The hoof is inserted in the recess of the knife when the cutter is in the position of cutter 38, Fig. 2, and while said cutter is rotating. 40 and 41 are curved hoof supports rising from the machine bed, and are located on each side of the cutter and close to the same. Owing to the curved shape of these hoof supports, the point *d* of the cutter will take hold and begin to cut as soon as the sole of the hoof is brought into contact with these supports, and the rest of the cutting edge will be brought into action as the cutter rotates toward the rolls. This rotatable cutting action of the cutter will carry the hoof toward the rolls, so that when the cutter has done its work, the hoof will slide down the inner inclined surface of the supports, in readiness to be pushed heel first into the bite of the rolls when engaged by the opposite end of the same cutter, as said opposite end is brought into cutting operation with another hoof. That part of the hoof that is severed by the knife is the inner edge or seam e, Fig. 9. Heretofore it has been the practice to remove the sole b of the hoof by cutting along the edges e f, and flattening out the remaining portion of the hoof to be utilized in cutting out button blanks in an automatic machine. As the sole was too small to be used in this machine, it was necessary to cut out the button blanks therefrom, by hand. The object, therefore, I have in view, is to sever the hoof at the short seam e, from toe to heel, thus leaving the sole integral with the rest of the hoof—Fig. 11—so that when the hoof is flattened out, the entire hoof can be run through the automatic button cutting machine.

To open up the severed hoof and thus prevent its passing into the rolls in a doubled or folded condition, I employ the curved shield 42 which lies close to the upper roll with its ends secured to the curved extension 43—Figs. 1 and 4—of the upper roll boxes. This shield will be engaged by the high part of the hoof, as the same is passing through the rolls, and forces the body into an open position. To assist in thus opening up the hoof, the spreader 44—Figs. 5 and 6—may be employed. The advanced thin blade 44 will first enter the opening g—Fig. 12—which opening has been previously made by the cutters, and by its engagement with the lower severed edge h will force the upper part of the hoof into a horizontal position preparatory to such upper portion entering the rolls.

45 are side guide plates adjustably secured to the bed on each side of the hoof supports, 40 and 41. These guide plates are higher than the supports and serve to maintain the hoofs in an upright position during the cutting process and until the hoof is within the bite of the rolls.

46 and 47 are skiving-knives located in the rear of the rolls, and are adapted to be adjusted to and from each other by any well known means, and also to secure a proper clearance at the rear. For this purpose I have shown the two wedges 48 and 49, which wedges are secured in any of their adjusted positions by the screws 50.

Before the hoofs are run through the machine they are first rendered pliable by heat, and the water tank 51 is placed under the lower knife 47 to cool the blanks. After passing the rolls and the cutting edges of the skiving-knives, the upper knife serving in conjunction with the lower one in keeping the blanks perfectly flat until they have cooled and have become sufficiently hardened to be ejected from the knives by another incoming blank. The speed of the rolls and splitting cutters are so timed in their operations as to insure a proper hardening of the blanks. Free circulation of water through the tank is assured by means of the pipes 52 and 53.

The purpose of the skiving-knives is to trim off all the superfluous and waste material from the blank. The upper roll, as before mentioned, can be adjusted parallel with the lower roll, or one end of said upper roll can be set higher than its opposite end, which will enable a large hoof to be run through on the high side of the roll at the same time that a small and thinner hoof is fed into the low side. The upper knife, 46, can also be adjusted by the interposed wedges to conform to this angular position of the upper roll. If required, a water tank can also overlie the upper knife. The knife adjusting wedges can, if desired, be set so as to carry the upper knife out of cutting action with respect to the hoof blanks.

While I show only two splitting cutters, it will be understood that the bed can be widened and the rolls lengthened to accommodate any number of such cutters, and, in fact, this would be preferable owing to the slow travel of the moving parts of the machine. In Figs. 1 and 3, the splitting cutters are set parallel with each other, and in Fig. 2 they are staggered, and while either arrangement may be adopted, the staggered position will better enable the operator to keep the cutters filled as fast as the hoof recesses therein reach the proper position to receive a hoof.

In Fig. 7, as before mentioned, is shown a modified operation of the hoof splitting knife. In this arrangement, the cutter 54 is made to operate vertically through the machine bed by any well known means, not shown, like for instance, a cam that can be properly timed. In this case, the cutter will vertically disappear below the bed in splitting the hoof, and when below the upper surface of the bed, the properly timed push rod, 55, will carry the split hoof into the bite of the rolls. The sole of the hoof is adapted to rest on the horizontal edge k, which edge will rise just far enough above the bed so as to afford free admission for the hoof before the knife descends, and the cutting operation will begin when the hoof is on the bed. The cutting edge a', is curved so that the point will begin to cut first and the cutting will have a shearing effect. If desired, the cutting edges of the cutters shown in the other views could also be curved. 56 is a hardened steel die inserted in the bed through which the cutter passes, and against the longitudinal edges of the die the cutting is effected. If desired, the edge $k$ can be carried down far enough for the sole of the hoof to rest on the die and bed, and not upon the edge $k$.

Splitting the hoof so that the sole will remain an integral part thereof before the severed hoof is opened or flattened out, and means for holding the finished blank until cooled, are among the principal objects of my invention. While I employ the rear portion of the skiving-knives to keep the rolled stock flat, I may dispense with the skiving process and employ two plates, or other like means.

Having thus described my invention, what I claim is:

1. A hoof splitting cutter, having a support for the hoof and an overhanging cutting lip adapted to enter the hoof, and means for actuating the cutter to sever the hoof.

2. A hoof splitting cutter having an overhanging cutting lip, and a support for the hoof, and exterior supports for the hoof during the cutting operation.

3. A rotatable hoof splitting cutter having an overhanging cutting lip on opposite sides and hoof supporting surfaces, exterior hoof supports adapted to support the hoof during the cutting operation.

4. A rotatable hoof splitting cutter having oppositely located and overhanging cutting lips and hoof supports, exterior hoof supports adapted to support the hoof during the cutting operation, and side guides to maintain the hoof in an upright position.

5. A rotatable hoof splitting cutter having oppositely located and overhanging cutting lips and hoof supports, exterior hoof supports to support the hoof during the cutting operation, and rolls, said cutter adapted to split a hoof and eject a previously split hoof into the rolls.

6. In combination with rolls and hoof splitting cutters, of means in advance of the rolls for opening a split hoof before entering the rolls.

7. In combination, rolls, hoof splitting cutters in advance of the rolls, skiving knives behind the rolls and a water cooling tank in connection with said knives.

8. In combination, rolls, hoof splitting cutters in advance of the rolls, skiving knives behind the rolls, means for adjusting the knives, and a water cooling tank in connection with the knives.

9. In a machine of the character described, comprising rolls, means for adjusting the same, hoof splitting cutters in advance of the rolls, means between the cutters and rolls for opening out the split hoof before it enters the rolls, opposed skiving knives behind the rolls, means for adjusting the knives, and a water cooling tank in connection with the knives.

10. In combination, rolls, means for adjusting the same, and opposed cooling plates in the rear of the rolls adapted to retain the rolled stock flat until cooled.

In testimony whereof I affix my signature in presence of two witnesses.

FRANCIS M. KEANE.

Witnesses:
S. S. MORRIS,
JAMES FEELEY.

Copies of this patent may be obtained for five cents each, by addressing the "Commissioner of Patents, Washington, D. C."